US007035269B2

(12) United States Patent
Rolston et al.

(10) Patent No.: US 7,035,269 B2
(45) Date of Patent: Apr. 25, 2006

(54) METHOD AND APPARATUS FOR DISTRIBUTED SYNCHRONOUS CLOCKING

(75) Inventors: David Robert Cameron Rolston, Pierrefonds (CA); David Victor Plant, Montreal (CA); Gordon Walter Roberts, Montreal (CA)

(73) Assignee: McGill University, Montreal (CA)

( * ) Notice: Subject to any disclaimer, the term of this patent is extended or adjusted under 35 U.S.C. 154(b) by 959 days.

(21) Appl. No.: 09/773,246

(22) Filed: Feb. 1, 2001

(65) Prior Publication Data

US 2002/0031199 A1 Mar. 14, 2002

Related U.S. Application Data

(60) Provisional application No. 60/179,751, filed on Feb. 2, 2000.

(51) Int. Cl.
*H04L 12/28* (2006.01)
*H04L 27/28* (2006.01)
*H04J 3/06* (2006.01)

(52) U.S. Cl. .................. 370/400; 370/503; 370/518; 375/260; 375/356

(58) Field of Classification Search ........ 370/516–520, 370/503; 375/212, 214, 260, 354–356
See application file for complete search history.

(56) References Cited

U.S. PATENT DOCUMENTS

| | | | |
|---|---|---|---|
| 4,411,007 A | | 10/1983 | Rodman et al. |
| 4,539,678 A | * | 9/1985 | Ambroise et al. .......... 370/438 |
| 4,716,575 A | * | 12/1987 | Douros et al. ............. 375/212 |

(Continued)

OTHER PUBLICATIONS

"A PLL Clock Generator with 5 to 110 MHz of Lock Range for Microprocessors", by I.A. Young, J.K. Greason, & K.L. Wong, in IEEE Journal of Solid-State Circuits, vol. 27, No. 11, Nov. 1992, pp. 1599-1606.

(Continued)

*Primary Examiner*—Seema S. Rao
*Assistant Examiner*—Melanie Jagannathan
(74) *Attorney, Agent, or Firm*—Thomas Adams

(57) ABSTRACT

A method and an apparatus are provided for synchronizing clock signals in spatially distributed nodes in large, synchronous electronic, optical, optoelectronic or wireless systems, such as systems comprising arrays of microprocessors and memories, and telecommunication systems. The nodes comprise a master node and a plurality of slave nodes. The master node generates first and second identical pulse trains and propagates them to the slave nodes via a first and second propagation channels, respectively, so that a pair of pulses, one from each pulse train, arrive at each slave node substantially simultaneously, travelling in opposite directions. Each slave node generates a clock signal event in response to the substantially simultaneous arrival of each pair of pulses. The master node maintains the rate of the two pulse trains such that there are "pN" pulses in each propagation channel at any time, where "N" is the number of nodes and "p" is an integer. Adjustable delays are provided at each slave node, disposed in each propagation channel. When the pulses in the two channels do not arrive simultaneously, the slave node adjusts the delay units so as reduce differences in the arrival times of subsequent pairs of pulses. The delay units may comprise pre-delay units upstream of the detection point and post-delay unit downstream of the detection point, any increment in a pre-delay being compensated by an equal decrement in the post-delay in the same propagation channel.

18 Claims, 4 Drawing Sheets

U.S. PATENT DOCUMENTS

| | | | |
|---|---|---|---|
| 4,977,581 A * | 12/1990 | Cerminara | 375/356 |
| 4,998,262 A | 3/1991 | Wiggers | |
| 5,058,132 A * | 10/1991 | Li | 375/260 |
| 5,293,626 A | 3/1994 | Priest et al. | |
| 5,307,381 A | 4/1994 | Ahuja | |
| 5,317,601 A | 5/1994 | Riordan et al. | |
| 5,327,468 A | 7/1994 | Edblad et al. | |
| 5,361,277 A | 11/1994 | Grover | |
| 5,499,275 A * | 3/1996 | Kishi | 375/357 |
| 5,537,498 A | 7/1996 | Bausman et al. | |
| 5,550,875 A * | 8/1996 | Bennett | 375/356 |
| 5,712,882 A * | 1/1998 | Miller | 375/356 |
| 5,734,685 A * | 3/1998 | Bedell et al. | 375/356 |
| 5,901,136 A * | 5/1999 | Lovelace et al. | 370/217 |
| 6,075,832 A * | 6/2000 | Geannopoulos et al. | 375/375 |
| 6,539,072 B1 * | 3/2003 | Donnelly et al. | 375/371 |
| 6,693,985 B1 * | 2/2004 | Li et al. | 375/355 |

OTHER PUBLICATIONS

"Simultaneous Bidirectional Receiver Logic", by Kanichi Ishibashi et al. in IEEE Micro, Jan.-Feb. 1999, pp. 14-18.

"Scaling Optoelectronic-VLSI Circuits into the 21st Century: A Technology Roadmap", by A.V. Krishnamoorty & D.A. Miller, in IEEE J. of Selected Topics in Quantum Electronics, vol. 2, No. 1, Apr. 1996, pp. 55-76.

"Optical Receivers for Optoelectronic VLSI", by T.K. Woodward, A.V. Krishnamoorthy, A.L. Lentine & L.M.F. Chirovski, in IEEE J. of Selected Topics in Quantum Electronics, vol. 2, No. 1, Apr. 1996, pp. 106-116.

"Optical Control of Distributed Actuator and Sensor Arrays" by B. Bamieh, F. Paganini and M. Dahleh, in SPIE, vol. 3323, Mar. 1998, pp. 467-478.

"Optical clock distribution to silicon chips" by B.D. Clymer and J.W. Goodman, in Optical Engineering, vol. 25, No. 10, Oct. 1986, pp. 1103-1108.

"A Synchronous Approach for Clocking VLSI Systems" by F. Anceau, in IEEE Journal of Solid-Sate Circuits, vol. SC-17, No. 1, Feb. 1982, pp. 51-56.

"Clock Distribution Using Coupled Oscillators", by I. Galton, D.A. Towne, J.J. Rosenberg and H.T. Jensen, in IEEE, 0-7803-3073-0-96, 1996, pp. 217-220.

"The Composite Banyan Network" by S-W Seo and T-Y Feng, in IEEE Transactions on Parallel and Distributed Systems, vol. 6, No. 10, Oct. 1995, pp. 1043-1053.

* cited by examiner

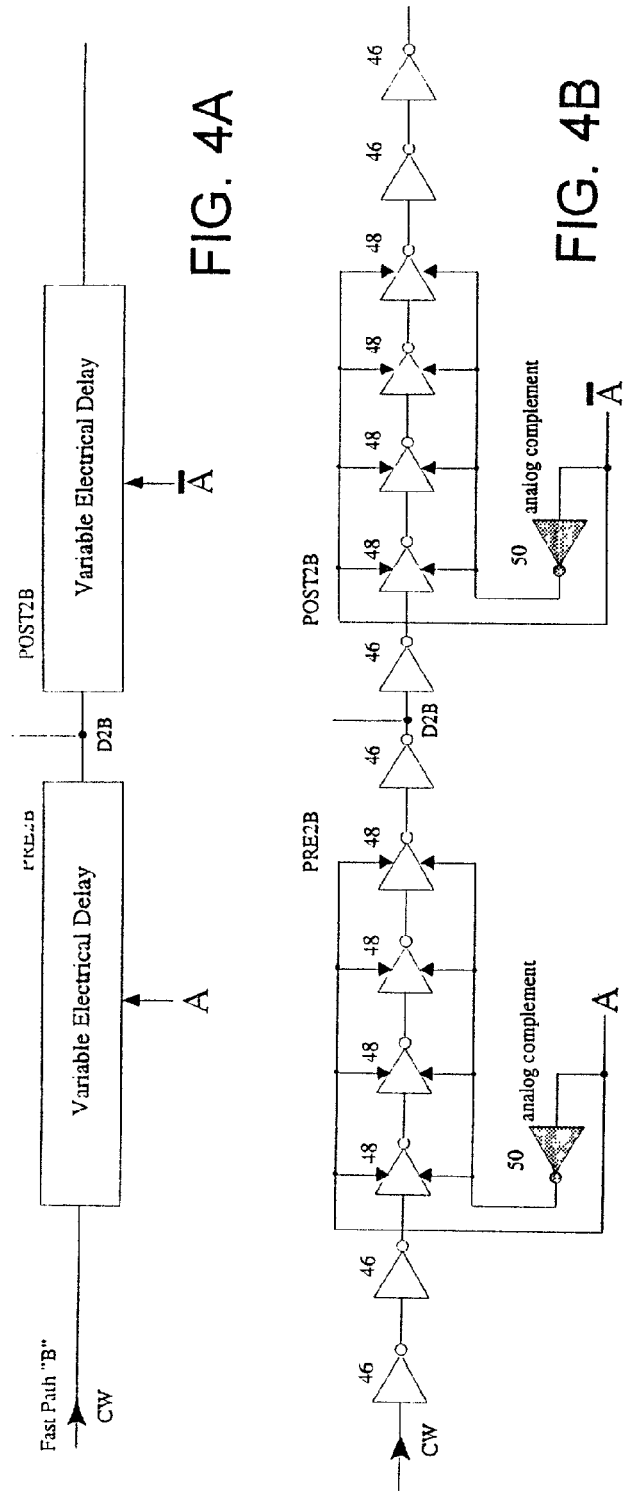
FIG. 4A
FIG. 4B
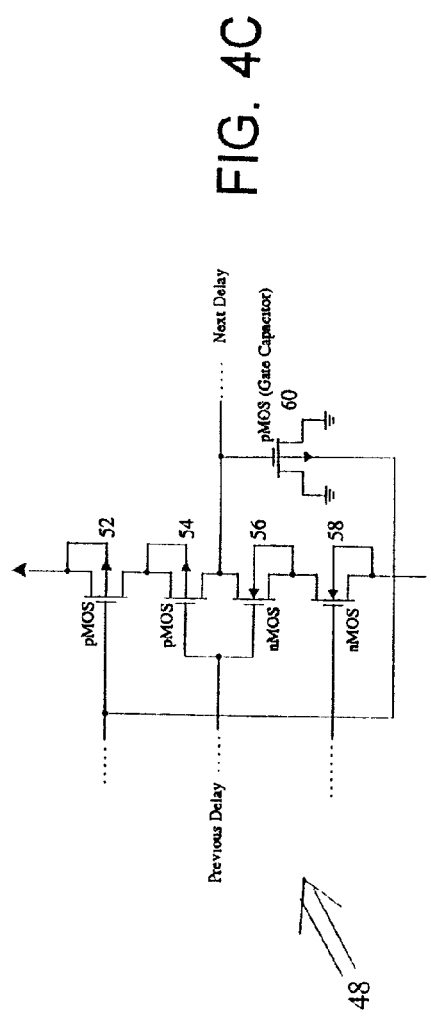
FIG. 4C

METHOD AND APPARATUS FOR DISTRIBUTED SYNCHRONOUS CLOCKING

This application claims priority from U.S. provisional patent application No. 60/179,751 filed Feb. 02, 2000.

FIELD OF INVENTION

The invention relates to a method and apparatus for providing synchronous clocking, and is especially applicable to synchronous clocking systems for spatially distributed nodes in large synchronous electronic, optical or optoelectronic systems. These can include computational systems that comprise arrays of microprocessors and memories, as well as telecommunication systems that must switch large amounts of data.

BACKGROUND OF INVENTION

Hitherto, synchronization techniques of most processing and switching circuitry have entailed the careful layout and the prudent use of many mechanisms such as phase-lock loops and binary-tree signal paths. These mechanisms are used to equalize delay paths to distributed nodes in a chip or system. As the speed of operation increases, however, primarily due to the reduction in transistor size, the skew and jitter of clocking signals along these paths becomes an ever increasing problem for the register-based architectures of most existing computing systems.

Clock-skew is especially problematic when the system exceeds a certain size, nominally when the delay paths become longer than a couple of centimeters. The power requirements and the transmission line effects for high-speed clock signals are not suited for standard printed-circuit board (PCB) layouts and typically limit the speed of operation to less than 100 MHz. These difficulties are compounded by the noise and coupling of multiple parallel data buses operating in unison on typical computing PCBs. The standard method for alleviating the synchronization problem has been to use asynchronous techniques such as FIFO memory buffering, control line protocols and error detecting/correcting codes. These contribute latency to the communication as well as lead to a greater amount of circuitry.

It is known to implement a distributed clock system using a set of equal length conductive wires or optical fibers arranged in a H-tree layout. U.S. Pat. No. 5,537,498, which issued to Bausman et al. on Jul. 16, 1996 is typical of this type of system developed by Cray Research Inc. However, this type of clocking structure is often difficult to calibrate. Great care must be used when cutting and connecting the wires of a T-branch to ensure that they are precisely the same length; otherwise the mismatch will cause the travelling pulses to arrive at their destinations at slightly different times, thus causing skew in the clocks. The most significant drawback to this design is the susceptibility of both the amplifiers and the connecting wires to environmental effects, such as temperature and time degradation.

Another approach is to distribute a clocking signal from a central point through some form of distribution network. These systems are exemplified in U.S. Pat. No. 4,411,007, which issued to Rodman et al. on Oct. 18, 1983, U.S. Pat. No. 5,307,381, which issued to Ahuja on Apr. 26, 1994 and U.S. Pat. No. 5,317,601, which issued to Riordan et al on May 31, 1994. These methods are generally complex and assume that the electrical characteristics of the transmission medium never change.

In another clocking arrangement, disclosed in U.S. Pat. No. 4,998,262 issued on Mar. 5, 1991 to Wiggers, two transmission lines both end-terminated with a resistor, each conduct a single pulse. Each node is attached to both lines with the first node being connected to the closer end of the first line and the farthest end of the second line. The average time between the arrival of the two pulses at any node is always the same and triggers the clocking signal for each node.

U.S. Pat. No. 5,361,277 issued to Grover on Nov. 1, 1994, discloses a further approach for providing clocking signals to a plurality of distant nodes, in which pulses are propagated along a single "open-terminated" conductor which passes every node. The pulses reflect at the open termination and the clock signal pulses are generated in dependence upon the arrival time at a node of a pulse and a "return" pulse. U.S. Pat. No. 5,734,685 (Bedell) issued Mar. 31, 1998 discloses a similar arrangement but with an extra "data" line. U.S. Pat. No. 5,712,882 (Miller) issued Jan. 27, 1998 also discloses a similar arrangement, but with an additional "data" line and a "mirror image" of the circuit.

In each of these clock synchronization arrangements, the pulses cannot be delivered at an interval shorter than the round-trip propagation delay of the transmission lines. Moreover, the arrangements cannot correct for any possible speeding-up or slowing-down in segments of the transmission line due to thermal variations, dielectric variations or other factors which can change propagation velocity within the medium.

SUMMARY OF INVENTION

It is an object of the present invention to overcome, or at least mitigate, the shortcomings of the known clocking arrangements and to provide a method and apparatus for synchronizing clocking at distributed nodes in synchronized electronic, optical or optoelectronic systems, such as computing or switching systems.

According to one aspect of the present invention, there is provided a method of providing synchronized clock signals at "N" distributed nodes in a synchronous system, the nodes comprising a master node and a plurality of slave nodes interconnected by first and second propagation channels. The method comprises the steps of:

at the master node,
(i) generating a first pulse train and a second pulse train each being regular and having a period (T),
(ii) propagating the first pulse train around the plurality of slave nodes via the first propagation channel;
(iii) propagating the second train of pulses around the plurality of slave nodes via the second propagation channel such that the pulses of the second train of pulses arrive at respective ones of the plurality of slave nodes in reverse order to the pulses of the first pulse train; and
(iv) maintaining the rate of each of the first and second pulse trains such that there are "pN" pulses in each propagation channel at any time, where "N" is the number of nodes, including the master node, and "p" is an integer, the pulses of the first train of pulses arrive at respective ones of the plurality of slave nodes substantially simultaneously, and the pulses of the second train of pulses arrive at respective ones of the plurality of slave nodes substantially simultaneously; and at each of the slave nodes, (v) detecting arrival at a predetermined detection point of a pair of pulses, the pair comprising one pulse from each of the first pulse train and the second pulse train; and (vi) generating a clock signal event in dependence upon the pair of pulses both arriving at the detection point with a phase difference below a preset level.

The method may further comprise, at each slave node, the step of adjusting delay units in each propagation channel, when the phase difference is greater than the preset level, so as to reduce the phase difference between subsequently-arriving pairs of pulses.

Preferably, the delay units in each propagation channel at each of the slave nodes comprise a pre-delay unit disposed upstream of the detection point and a post-delay unit disposed downstream of the detection point, any increment in a pre-delay unit being compensated by an equal decrement in the post-delay unit disposed in the same propagation channel. When each of the slave nodes is generating clock signal events, and the clock signal events of the different nodes are synchronized, the effective temporal length of the channel segment between detection points of each pair of adjacent nodes, i.e., comprising the delay units in the adjacent nodes and the intervening section of the propagation channel, is equal to the temporal length of the channel segment between respective detection points of each other pair of nodes.

The pre-delay and post-delay in any one node are not necessarily the same as in the other slave nodes.

The step of maintaining the pulse rate may comprise the step of dividing the frequency of the first and second pulse trains by an integer multiple of the number of nodes, to produce a third pulse train at a lower frequency, propagating the third pulse train around the nodes via a third propagation channel substantially identical to the first and second propagation channel, and adjusting the rate of the first and second pulse trains to maintain a predetermined phase relationship between third pulse train pulses entering the third propagation channel and third pulse train pulses leaving the third propagation channel.

According to a second aspect of the invention, there is provided apparatus for providing synchronized clock signals at "N" distributed nodes in a synchronous system, the apparatus comprising a master node unit and a plurality of slave node units interconnected in series by first and second propagation channels, the master node unit comprising:

pulse generation means for providing a first pulse train and a second pulse train, the pulse trains each being regular and both having the same period;

means for propagating the first pulse train around the slave nodes via the first propagation channel and the second pulse train around the slave nodes via the second propagation channel; and means for maintaining the rate of the first pulse train and second pulse train such that, at any instant, there are "pN" pulses in each propagation channel, where "N" is the number of nodes, including the master node, and "p" is an integer; and such that the pulses of the second pulse train arrive at respective ones of the plurality of slave nodes substantially simultaneously and the pulses of the first pulse train arrive at respective ones of the plurality of slave nodes substantially simultaneously, but in reverse order to the first pulse train;

each of the slave node units comprising:

detection means for detecting arrival at a predetermined detection point of a pair of pulses comprising one pulse from each of the first pulse train and the second pulse train, respectively, and generating a clock signal event in dependence upon the phase difference between the pair of pulses being less than a preset level.

Each slave node unit may comprise adjustable delay units disposed in each propagation channel and means responsive to phase differences between the pairs of pulses being greater than the preset level for adjusting the delay units so as to reduce phase differences between subsequently-arriving pairs of pulses, the arrangement being such that, when the pairs of pulses have substantially no phase difference, each propagation channel segment between a pair of adjacent ones of the nodes provides the same propagation delay as every other propagation channel segment between a different pair of adjacent nodes.

The adjustable delay units may each comprise a pre-delay unit disposed upstream of the detection point and a post-delay unit disposed downstream of the detection point, and each slave node may further comprise means for adjusting the duration of the pre-delay unit and post-delay unit such that any increment in the pre-delay unit is compensated by an equal decrement in the post-delay disposed in the same propagation channel, and vice versa.

The adjusting means may adjusts pre-delay units and post-delay units in both propagation channels, such that increments and decrements to a pre-delay in one of the propagation channels are accompanied by equal decrements and increments, respectively, to the post-delay in the other of the propagation channels.

Each of the pre-delay units and post-delay units may comprise a plurality of delay elements and the slave nodes may each have means for increasing the number of delay elements active in one of the delay units and decreasing the number of active delay elements in the other of the delay units correspondingly.

Each detection means may comprises a phase/frequency device that provides an error signal proportional to the phase difference between the pair of pulses from the first and the second pulse trains. The slave node then may have means responsive to the error signal for controlling the adjustable delay units.

Preferably, the propagation channels linking the detection means at the different nodes are provided by a single propagation path, which may be electrical or optical.

According to a third aspect of the invention there is provided apparatus for synchronizing arrival times at a detection point of pulses in two pulse trains traversing the detection point in opposite directions, the apparatus comprising a plurality of delay units, comprising first pre-delay means and first post-delay means disposed prior to, and following, respectively, the detection point in a first propagation channel whereby pulses of the first train traverse the detection point, second pre-delay means and second post-delay means disposed prior to, and following, respectively, the detection point in a second propagation channel whereby pulses of the second train traverse the detection point, detection and control means for detecting phase differences between pulses from the first and second pulse trains and, responsive thereto, adjusting the delay units selectively so as to reduce the phase differences to below a preset level.

Various objects and aspects of the invention will be clear from the following detailed description, taken in conjunction with the accompanying drawings, of a preferred embodiment which is described by way of example only.

BRIEF DESCRIPTION OF THE DRAWINGS

FIG. 4A illustrates a delay unit as used in any of slave nodes, and which comprises a plurality of delay elements;

FIG. 4B is a logic representation of the delay unit of FIG. 4A; and

FIG. 4C illustrates one of the delay elements in more detail.

DETAILED DESCRIPTION OF PREFERRED EMBODIMENT

Figure 1:
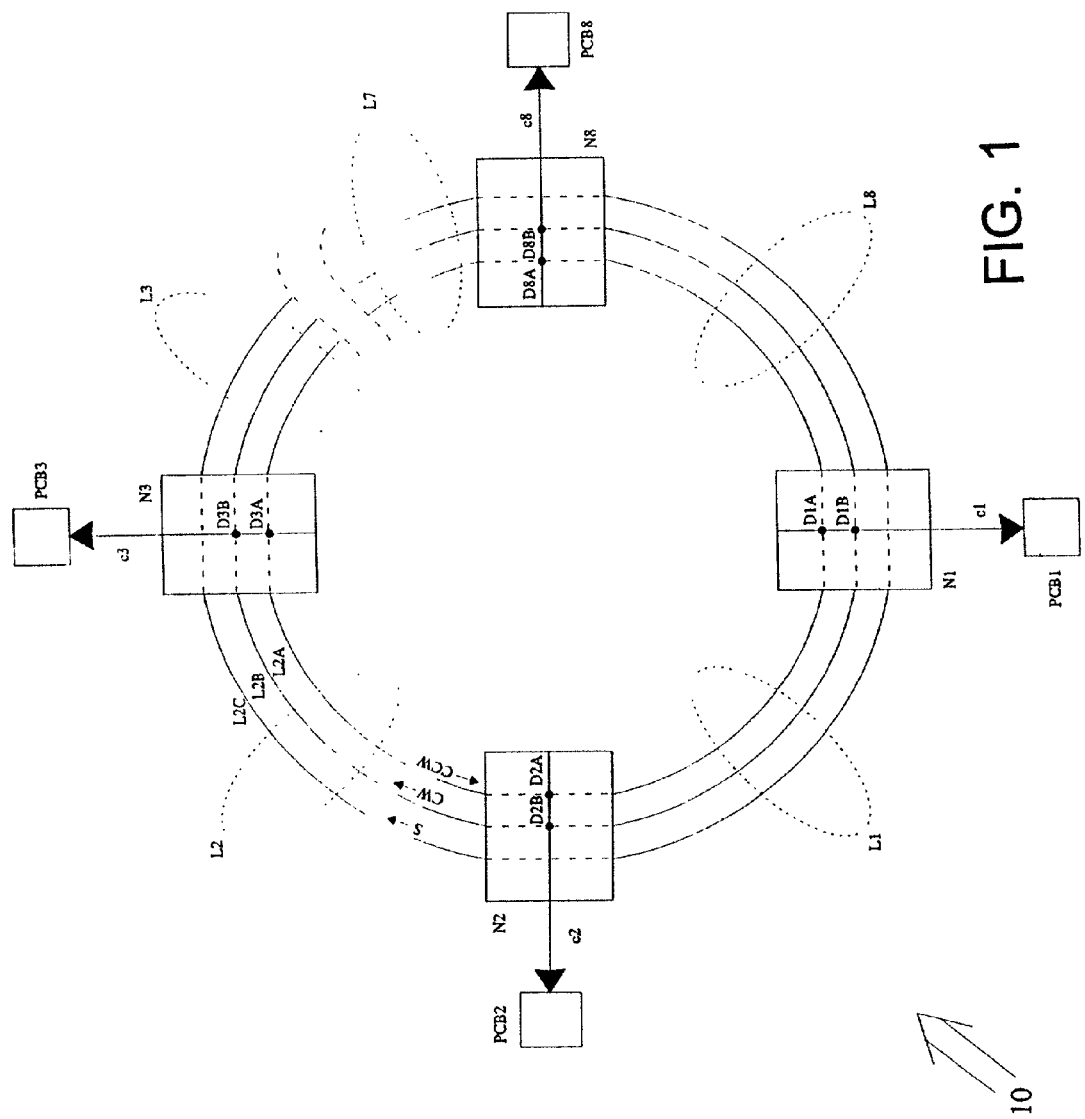
FIG. 1 illustrates schematically a synchronous clocking system in accordance with the present invention for synchronizing clock signals at a master node and a plurality of slave nodes in a synchronous electronic system.

In the drawings, corresponding items in the different Figures have the same reference numbers.

Figure 2:
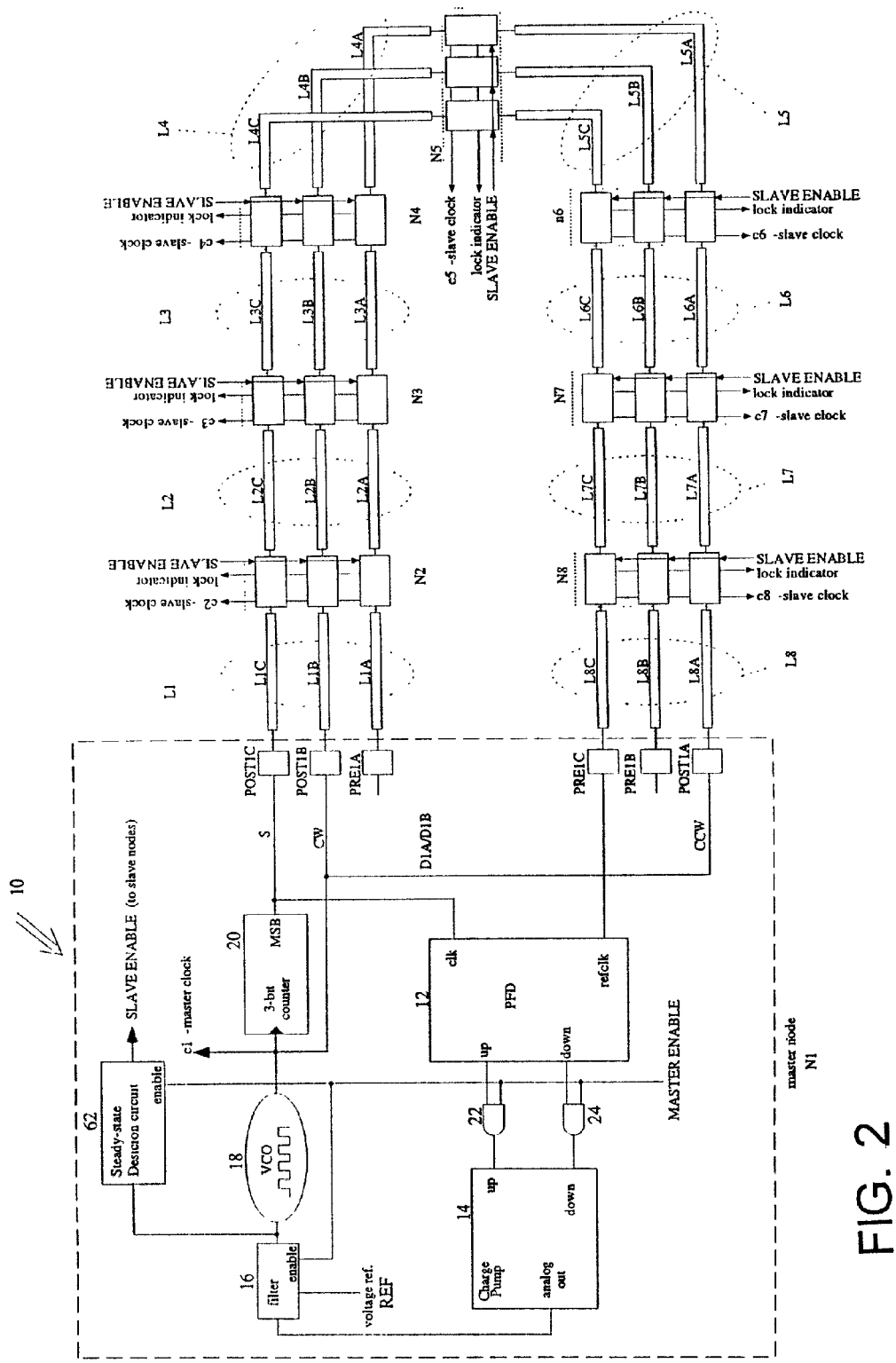
FIG. 2 illustrates schematically the synchronous clocking system with a master node shown in greater detail.

FIGS. 1 and 2 illustrate, schematically, a high-speed synchronous digital system 10, such as a computing or communications switching system, having a plurality of nodes N1 . . . N8 interconnected by propagation channels L1 . . . L8 for clock synchronization pulses. Node N1 comprises a master node and nodes N2 . . . N8 comprise slave nodes. For ease of illustration, only four of the nodes, N1, N2, N3 and N8, are shown in FIG. 1. It should be appreciated that the invention is not limited to systems having only eight nodes, however; a practical system could have many more nodes. The nodes N1, N2, N3, . . . N8 are associated with system parts whose operations are synchronized by clock signals c1, c2, c3, . . . c8, supplied by nodes N1, N2, N3, . . . N8, respectively. These system parts are represented as printed circuit boards PCB1, PCB2, PCB3, . . . PCB8, respectively, but it should be understood that they need not be printed circuit boards. It should also be understood that any transition of each clock signal c1, c2, c3, . . . c8, such as the rising edge, might comprise the "clock signal event" which is to clock the PCBs, etc.

In order to ensure that data can move between the PCBs at high speed in a synchronous manner, the nodes N1, N2, N3, . . . N8 each comprise circuitry for synchronizing the clock signals c1, c2, c3 . . . c8, thus precluding skewing. Synchronization of the clock signals c1, c2, c3, . . . , c8, is achieved by propagating two trains of pulses CW and CCW around the nodes N1, N2, N3, . . . N8 in opposite directions. The pulse trains CW and CCW are generated in master node N1, which transmits them to the slave nodes N2, N3, . . . N8, by way of propagation channels provided by transmission links L1, L2, L3, . . . L8 which interconnect the nodes N1, N2, N3, . . . N8 to form a ring. The transmission links L1, L2, L3, . . . L8 actually comprises three parallel propagation paths. The two innermost paths, designated A and B carry the pulse trains CW and CCW, respectively, and the third path, designated C, carries a slower pulse train S. Although each of the transmission links L1, L2, L3, . . . L8 is shown as if it comprised three distinct wires, in practice, it would preferably comprise a single transmission medium so that all three trains of pulses would experience the same propagation delay. The master node N1 generates the third train of pulses S at a slower rate and propagates them around the ring of nodes N1 . . . N8. It adjusts the pulse repetition rate of the "fast" pulse trains CW and CCW in dependence upon the time taken for pulses in the third pulse train S to propagate around the ring. Adjustment of the pulse repetition rate of the "fast" pulse trains will be described later.

In FIG. 1, the pulse trains CW and CCW are shown propagating in the clockwise and counterclockwise directions, respectively. Within the slave nodes N2, N3, . . . N8 are detection points D2A, D2B; . . . D8A, D8B, respectively. In the master node N1, the output of VCO 18 represents the "detection point" D1A, D1B since, at that point, the pulses of pulse trains CW and CCW are coincident, even though there is no detection, as such. The clock signal c1 for the master node N1 is derived from the same point. The nodes N2, N3, . . . N8 each provide one "event" of the corresponding one of the clock signals c2, c3, . . . c8, respectively, in dependence upon the phase difference between pulses in each pair CW and CCW as they arrive at the detection point being less than a preset level. The pulse trains CW and CCW are at the same rate, for example 100 MHz. If the clocking system is properly synchronized, with the same propagation time between the respective detection points of any pair of adjacent nodes, and the pulse rate is properly adjusted, pairs of counter-propagating pulses CW and CCW will pass each other at all of the nodes simultaneously and all of the slave nodes N2 . . . N8 will generate clock signal events simultaneously. If the two pulses do not arrive at the detection point of a particular slave node coincidentally, i,e., with substantially no phase difference, the slave node adjusts the propagation delay in the propagation paths adjacent that node to reduce the phase difference between subsequent pairs of pulses.

Although the trains of pulses must take the same time to propagate between respective detection points of any pair of adjacent nodes, the propagation times for the different links L1 . . . L8, need not be the same, For example, L2 could introduce a propagation delay of 5.2 nsec. and L3 a propagation delay of 2.9 nsec. and the delay units would compensate for the difference.

Thus, FIG. 1 shows fast pulse train CCW propagating in the innermost path L1A, L2A, L3A, . . . L8A in a counterclockwise direction, fast pulse train CW propagating in the middle path L1B, L2B, L3B, . . . L8B in a clockwise direction, and slow pulse train S propagating in the outermost path L1C, L2C, L3C, . . . L8C. Slow pulse train S could propagate in either direction but is shown propagating in a clockwise direction. The number of pulses "n" in each of the fast pulse trains CW and CCW at any time is "pN", i.e., equal to an integer multiple of "N", the number of nodes in the system 10. Preferably, the number of pulses "n" is equal to "N", i.e. integer p preferably is unity. The leading edges of the pulses CW travelling in one direction and the leading edges of pulses CCW travelling in the opposite direction are sensed by detection circuitry in the nodes N1, N2, N3, . . . N8, respectively. The spacings between pulses, and the propagation times between detection points D1A/D1B, D2A/D2B, D3A/D3B, . . . D8A/D8B in the nodes N1, N2, N3, . . . N8, respectively, are such that pairs of oppositely-propagating pulses will arrive substantially simultaneously at the detection points in respective ones of the nodes N1, N2, N3, . . . N8. Once the system has been initialized, as will be described later, and is stable, the arrival of each pair of counter-propagating pulses at each of the slave nodes will generate an event/transition of the corresponding one of the clock signals c1, c2, c3, . . . c8, respectively.

Referring now to FIG. 2, the master node N1 is composed of elements that allow a precise number of pulses to be generated by using a phase-lock loop structure formed by a phase-frequency detector 12, a charge pump 14, a filter 16 and a voltage-controlled oscillator (VCO) 18. The output of the VCO 18 comprises a "fast" train of pulses at for example, 100 MHz which is supplied, as pulse train CW, to the "start" end of link L1B by way of a delay POST1B and, as pulse train CCW, to the "start" end of link L8A via delay POST1A. The output of VCO 18 is also supplied as clock signal c1 to the associated printed circuit board PCB1.

The pulse trains S and CW are supplied to links L1C and L1B by way of delay elements POST1C and POST1B, respectively, and the fast pulse train CCW is supplied to link L8A by way of a delay element POST1A. Having propagated around the ring, the three pulse trains S, CW and CCW are extracted from their respective propagation paths via delay elements PRE1C, PRE1B and PRE1A, respectively. The delay elements PRE1C, PRE1B, PRE1A, POST1C, POST1B and POST1A are fixed delays; each emulates approximately half the delay of each of the slave-nodes N2 ... N8. Hence, half of a slave-node's delay is added as the signals leave the master-node N1 and the other half of the delay is added as the signals return to the master-node N1. These delays make it easier for the pulse generation circuitry in the master node N1 to maintain exactly "N" pulses for "N" nodes.

The VCO 18 also supplies the "fast" pulse train to a synchronous counter 20 which divides it to produce a "slow" pulse train S which it supplies to link L1C via a delay POST1C. In order to produce "n" pulses for "N" nodes, the counter 20 is a "b"-bit synchronous counter (where b=$\text{Log}_2$ (n)). Assuming that VCO 18 produces a square-wave pulse train of frequency "f", the "b"-bit counter 20 will divide this frequency by "N" and produce a frequency of "f/N". Hence, for eight nodes, the counter 20 is a 3-bit counter. Since the VCO 18 produces a 100 MHz square wave, the most-significant bit of the "3"-bit counter 20 will produce a 12.5 MHz square wave as slow pulse trains. When the "fast" frequency "f" pulse trains CW and CCW and the "slow" (frequency "f/N") pulse train S are distributed into the system, the entire delay around the system must be "N/f" seconds for both the "fast" and "slow" paths, such that the "fast" path carries "N" square-wave periods of "1/f" seconds and the "slow" path carries 1 squarewave period of "N/f" seconds.

The frequency or pulse repetition rate of the "fast" pulse trains CW and CCW, i.e. the output frequency of the VCO 18, is controlled by the phase-frequency detector (PFD) 12, the charge pump 14 and the filter 16 in dependence upon the "slow" pulse train S, which is the only one of the three pulse trains S, CW and CCW, which is required to complete a loop around the ring of nodes N1 ... N8. Thus, the square-wave pulse train S from the output of the 3-bit counter 20 also is applied directly to the CLK input of the phase detector 12, i.e. before it enters the ring via delay POST1C and link L1C. After it has traversed the ring, the "return" slow signal S leaves link L8C via a delay unit PRE1C and is applied to the REFLCK input of the phase-frequency detector (PFD) 12. This PFD circuit 12 also is very standard and is based upon a digital 3-state finite state machine. The PFD circuit 12 compares the two "go" and "return" square-wave slow pulse trains at its CLK and REFCLK inputs and produces 0-to-5 volt error pulses at its UP and DOWN outputs that are proportional to the magnitude and sign of the mismatch between the two square-wave signals at its inputs. The charge pump circuit 14 converts the 0-to-5 volt pulses from PFD 12 into current pulses and feeds them into the filter 16. The filter 16 is a low-pass filter which filters the output of the charge pump 14 and applies the filtered voltage to control the VCO 18. When there is zero phase error between the "go" and "return" slow pulse train pulses appearing at the respective CLK and REFCLK inputs of the PFD 12, the VCO 18 maintains a fixed frequency. It can be shown that, when there is zero phase error, there is exactly 1 period of squarewaves in the "slow" propagation path formed by links L1C ... L8C, and exactly "N" periods of square-wave pulse trains CW and CCW in the fast propagation paths formed by links L1A ... L8A and L1B ... L8B.

Before normal operation of the synchronization system commences, there is an initialization period to ensure that pairs of counter-propagating pulses appear substantially simultaneously at each of the slave nodes N2 ... N8. The filter 16 is a second-order low-pass RC-circuit with an added gating transistor (not shown) that allows a reference voltage REF to be gated onto the output of filter 16 under the control of an ENABLE signal, so as to force a corresponding known voltage at the output of the filter 16 during a period when the system is being initialized. Maintaining this known voltage at the input to the VCO 18 ensures that a constant frequency output square-wave is produced while initialization takes place. A pair of two-input AND-gates 22 and 24 each have one input connected to a respective one of the UP and DOWN outputs of the PFD 12 and their outputs connected to the UP and DOWN inputs, respectively, of the charge pump 14. The AND gates 22 and 24 can be enabled by a user-controlled MASTER ENABLE signal applied to their respective second inputs. These AND gates are used in conjunction with the reference voltage REF applied to the filter 16 when the system is being initialized. When the AND gates 22 and 24 are disabled, they block the digital pulses from the phase-frequency detector (PFD) 12. After a short period, of time which is equal to at least the propagation delay around each of the propagation channels, the AND gates 22 and 24 are enabled, the reference voltage REF is removed, and normal operation of the circuit commences.

In order for the clock signals c1, c2, c3, ... c8 for nodes N1, N2, N3, ... N8 to be synchronized, the propagation time for a particular pair of pulses, one from each of the pulse trains CW and CCW, travelling in opposite directions between the master node N1 and the detection point in any one of the slave nodes N2 ... N8 must remain substantially the same. Because the propagation time between detection points of adjacent nodes can be affected by environmental changes and time degradation, the system can detect changes in the synchronization of the system and adjust for these changes to maintain complete synchronization throughout the entire system. This is achieved by having each slave node in the system detect and correct for these changes by itself, without the use of a "global" synchronization control mechanism. The slave nodes N2 ... N8 are identical, so only one of them, node N2, is illustrated in more detail in FIG. 3, and will now be described.

Figure 3:
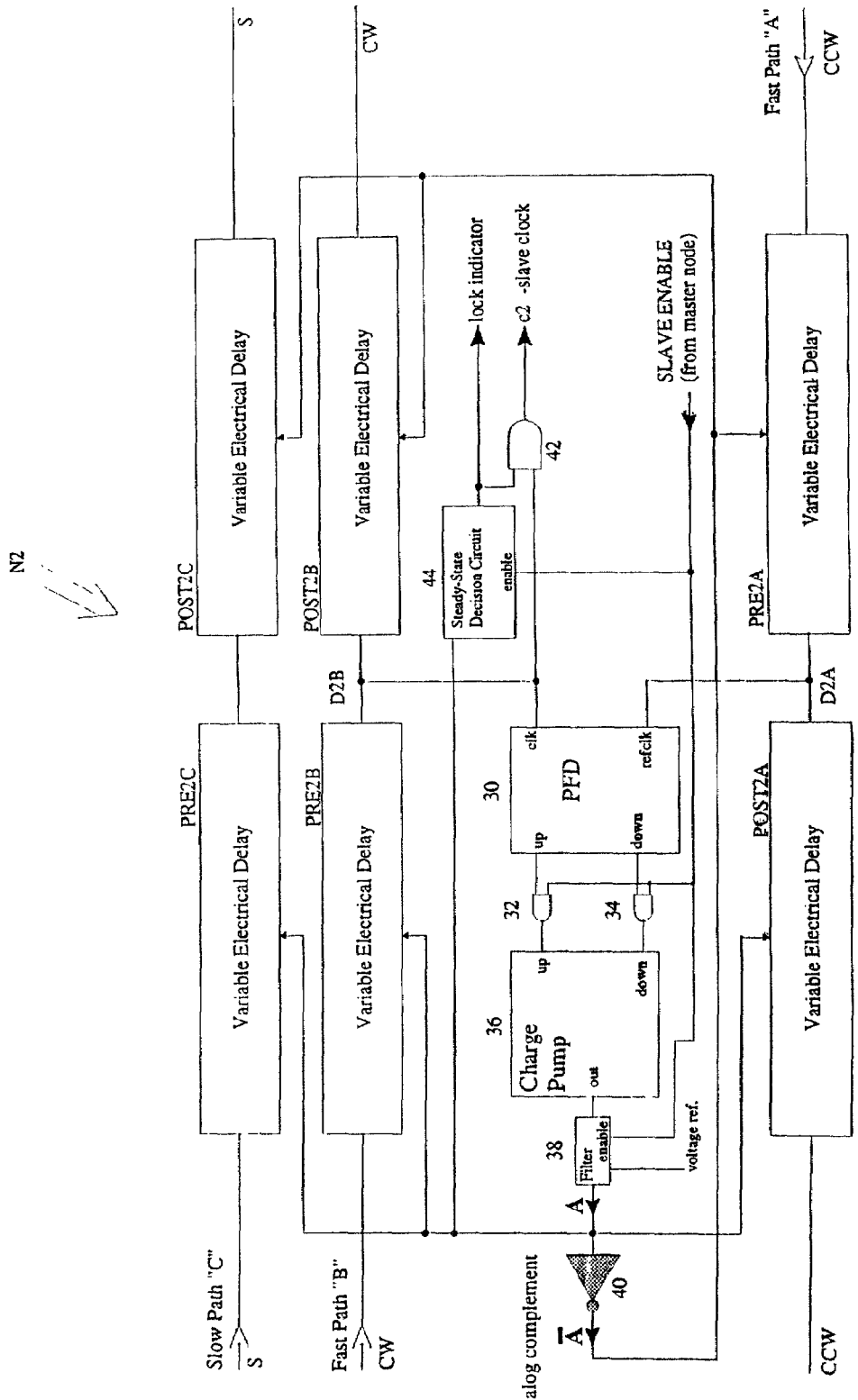
FIG. 3 illustrates schematically one of the slave nodes of the synchronous clocking system.

Referring to FIG. 3, slave node N2 has three pairs of electrical variable delay units, one pair in each of the three pulse propagation paths A, B and C. Each pair comprises a PRE-delay and a POST-delay. The "fast" paths A and B have "PRE" delays PRE2A and PRE2B, respectively, which are upstream of the detection points D2A and D2B, respectively, in the propagation direction, and "POST" delays POST2A and POST2B, respectively, which are downstream of the detection points D2A and D2B, respectively. The "slow" path C has delays PRE2C and POST2C which are similar to those in paths A and B, but they have no detection point between them, since the slow pulses are not detected in the slave nodes. It should be appreciated that changes to the delays in the "fast" paths A and B will affect their overall effective length or transmission time. Providing similar delays in the "slow" path C, and adjusting them along with those in the "fast" paths A and B, ensures that the overall effective length or transmission time of the "slow" path changes too, and causes the master node N1 to make a corresponding change in the pulse repetition rate, vis. by means of VCO 18.

The propagation delay of each of the variable delay units can be adjusted by means of a quasi-dc control voltage which is supplied by a phase and frequency circuit comprising a phase and frequency detector 30, a charge pump 36, a filter 38, and AND gates 32 and 34. These components are interconnected, and operate, in a similar manner to the corresponding components of the master node N1. Thus, the phase and frequency detector (PFD) 30 has CLK and REFCLK inputs. The CLK input is connected to the detection point D2B in the CW path, namely the connection between the output of variable delay circuit PRE2B and the input of variable delay circuit POST2B. The REFCLK input is connected to the detection point D2A in the CCW path, namely the connection between the output of variable delay circuit PRE2A and the input of variable delay circuit POST2A. The UP and DOWN outputs of the PFD 30 are connected to respective inputs of the AND gates 32 and 34, whose outputs are connected to the UP and DOWN inputs, respectively, of the charge pump 36. The other inputs of the AND gates 32 and 34 are used to enable and disable them by means of a SLAVE ENABLE signal. The output of the charge pump 36 is filtered by low pass filter 38 and applied, as voltage A, in common, to the control inputs of variable delay circuits PRE2B, PRE2C and POST2A, respectively. An analogue inverting amplifier 40 connected to the output of filter 38 produces the analogue complement $\overline{A}$ of the output of the filter 38 and supplies it, in common, to the control inputs of variable delay circuits PRE2A, POST2B and POST2C, respectively. (See also FIG. 4A, which shows variable delays PRE2B and POST2B only). The arrangement is such that, as the delays POST2A, PUR2B and PRE2C are increased by application of voltage A, the delays PRE2A, POST2B and POST2C are decreased by the same amount by application of the complementary voltage $\overline{A}$, and vice versa.

The signals "A" and "$\overline{A}$" are complements of each other, and are analogue signals. This means that with respect to the Power and Ground voltages, the analogue complement $\overline{A}$ of the voltage A is $\overline{A}$=([Power−Ground]−A). For example, if power=5−V. Ground=0−V, and A=1.69−V, then $\overline{A}$=3,31−V. It should be noted that neither voltage A nor voltage $\overline{A}$ can attain values larger than the voltage Power or smaller than the Ground voltage.

As shown in FIG. 4B, which is a logic-symbol representation, the delay units PRE2B and POST2B are formed by seven matched pairs of inverters, each inverter haying its fall-time to rise-time delay compensated by the rise-time to fall-time of the next inverter in the same series. Thus, variable delay unit PRE2B comprises a series of seven inverters, the output of the last in the series being connected to decision point D2B. The first two and the last of each set of seven inverters comprise simple inverters 46. The other, middle, four inverters 48 are variable delay inverters. The control input of the variable delay unit PRE2B, to which the analogue voltage A is applied, is connected to each of the middle four inverters 48, An additional analogue inverter 50 has its input connected to the control input of the variable delay unit PRE2B and supplies the complement $\overline{A}$ to the middle four inverters 48. The variable delay unit POST2B comprises a similar series of seven inverters, the first having its input connected to decision point D2B and the last connected to the output of the variable delay unit POST2B. Again, the seven inverters comprise three simple inverters 46, four variable delay inverters 48, and an additional analogue inverter 50 for providing the complement. In this case, the original complement $\overline{A}$ is inverted to produce the voltage A and both are applied to the middle four inverters 48, i.e. oppositely to the arrangement of variable delay unit PRE2B.

As shown in FIG. 4C, each of the variable delay inverters 48 is a current-starved CMOS inverter formed by four MOSPETS 52, 54, 56 and 58 with a MOSFET 60 acting as a Gate Capacitor attached to its output. The outer pMOS transistor 52 and the outer nMOS transistor 58 act as voltage controlled resistors. When the voltage on the pMOS transistor 52 is high (with the complementary low voltage on the nMOS transistor 58), each of the pMOS transistor 52 and the nMOS transistor 58 acts as a high resistance. This slows the charging of the output and adds delay to the element 48.

The second mechanism used to add delay is the pMOS transistor 60 at the output that adds or subtracts a variable capacitance, namely the capacitance between the gate and the doped substrate of transistor 60. This capacitance is directly dependent upon the voltage applied to it. The more capacitance is added to its output in this way, the slower the response of inverter 48 becomes.

Referring again to FIG. 3, the detection points D2B and D2A constitute reference points for determination of the relative phase and frequency of the counterpropagating CW and CCW pulses in their respective paths. Accordingly, detection points D2B and D2A are connected to the CLK and REFCLK inputs, respectively, of PFD 30. The PFD 30 senses the arrival at the detection points D2B and D2A of the CW and CCW pulses in the "fast" path B and "fast" path A, respectively, and outputs an error signal depending upon the magnitude and sign of the phase error between each pair of a CW pulse and a CCW pulse. If there is a non-zero error, the PFD 30, charge pump 36, and filter 38 bring the pulses closer to synchronism by adjusting the delays in both path A and path B by means of voltage A. For example, if the CW pulse arrives before the CCW pulse, the delay PRE2B in path B is increased and delay PRE2A in path A is decreased. Although this will not affect the current CW and CCW pulses, it will effectively retard subsequent CW pulses and advance subsequent CCW pulses. The process will continue until each pair of a CW pulse and a CCW pulse arrive at the detection points D2B and D2A at the same time.

The total propagation delay through the node must remain constant. Because the complementary voltage $\overline{A}$ is applied to the other delay in each pair, as the incoming CW pulses are retarded by increasing the delay PRE2B, the outgoing CW pulses are advanced by decreasing the delay POST2B by the same amount. Likewise, as the delay PRE2A is decreased, the delay POST2A is increased. If each pair of variable delay circuits is considered to be one tapped delay and the connection between them a tapping point, increasing one delay and decreasing the other has the effect of moving the tapping point (the detection point) until it is coincident with the position at which the arrival of the CW pulse in the clockwise propagation path coincides with the arrival of a CCW pulse in the counterclockwise path.

If total delay through the node is not kept approximately constant, a form of positive feedback may result. For example, if an incoming pulse is retarded before it reaches the detection point, and there is no means of advancing it again before it leaves the node, then the delay around the entire system is progressively increased and eventually the VCO 18 in the master-node reaches the limits of its range.

The adjustments to the variable delay circuits in the slave-nodes N2 . . . N8 are internally balanced so that the total "transit" delay between the input and output of the node is always the same. Also, the propagation time between detection points of adjacent nodes must be the same. Hence, if each node in the system has a pair of PRE- and POST-delays which together give a constant "transit" time of 10 ns for the node, but the effective lengths of the transmission lines connected between nodes change, such that slave node N2 increases variable delay PRB2B by +1.3 ns and reduces variable delay POST2B by −1.3 ns, and slave node N3 increases variable delay PRE3B by +2.2 ns and reduces variable delay POST3B by −2.2 ns, the propagation time between the detection points D2B and D3B will increase by 0.9 ns, over and above any change in the propagation time for the path L2B itself.

As mentioned earlier, adjusting the delays to take into account the changes in inter-node propagation times, requires the frequency of the VCO 18 in the master-node N1 to be adjusted to maintain the relationship n=pN. Within slave node N2 . . . N8, this is accomplished by altering the "slow" clockwise variable electrical delay circuits PRE2C, POST2C; PRE3C, POST3C; . . . PRE8C, POST8C, respectively, by the same amounts as the "fast" clockwise variable electrical delay circuits are altered. This will affect the total time taken for the slow pulse train to traverse the ring of nodes and, hence, the resulting phase error appearing at the PFD 12 in the master-node N1. The PFD 12, charge pump 14, and filter 16 will adjust the frequency of the VCO 18 so that the period of the fast pulse trains is always a multiple of the average propagation time between nodes. It should be noted, however, that delays PRE1C and POST1C in master node N1 (FIG. 1) are not adjusted.

Referring again to FIG. 3, within slave node N2. the clock signal c2 is produced by a two-input AND gate 42 which has one input connected to the output of a steady-state circuit 44 and the other input connected to the detection point D2B, and hence to the CLK input of PFD 30. The steady-state circuit 44 can determine whether or not the signal at its input has stopped changing. Providing that there is a phase error between the pulses at the inputs of the PFD 30 that is less than a preset level, the voltage A at the output of the filter 38 will settle to a constant voltage, such as 1.95 volts. The steady-state circuit 44 will detect that this has occurred and enable AND gate 42. This functionality can be achieved using digital signal processing (DSP) techniques.

When the average derivative of the output of filter 38 is zero, or the output voltage itself is constant within certain bounds (depending upon the sensitivity of the PLL circuits), the output of steady-state circuit 44 goes high and enables the output AND gate 42. On start up, the pulses at the inputs CLK and REFCLK of the PFD 30 are not aligned and their phase difference causes the PFD 30 and charge pump 36 to change the output of the filter 38 causing the PRE and POST delays to change. When the output of filter 38 becomes steady, the inputs to the CLK and REFCLK of the PFD 30 must be the same. Hence, the CW pulses in path B and the CCW pulses in path A must be arriving at the decision points D2B and D2A at the same time. When both pulses arrive simultaneously, and are stable, the output of filter 38 is constant and the steady-state circuit 44 enables the AND gate 42, which allows subsequent pulses appearing at decision point D2B to be outputted to PCB2 (FIG. 2) as the clock signal c2. The output clock c2 could, of course, be the other "fast" path pulse train CCW.

It will be appreciated that adjustments to the variable delay circuits, and the VCO 18, in a particular bit period will affect only subsequent pulses. Over a period of time, however, the system will settle to a condition in which both the frequency and the propagation delay intervals are correct.

The phase-frequency detector circuit described in the publication by I. A. Young, J. K. Greason, & K. L. Wong, "A PLL Clock Generator with 5 to 110 MHz of Lock Range for Microprocessors", IEEE Journal of Solid-State Circuits, Vol. 27, No. 11, November 1992, pp. 1599 to 1606 may be used as a basis for the PFDs 12 and 30 described herein.

Initialization

It is necessary to initialize the system to ensure that pulses from pulse trains CW and CCW are present at all nodes before normal operation commences.

The nodes include additional elements for use during initialization of the system. Thus, as shown in FIG. 2, the master-node N1 also includes a steady-state circuit 62 that has its input connected to the "output" side of the filter 16, and can be enabled and disabled by the MASTER ENABLE signal which is applied also to filter 16 and AND gates 22 and 24 and is user-controlled. The steady-state circuit 62 is used to detect when the PLL feedback has attained a lock, whereupon it provides the "SLAVE ENABLE" signal and broadcasts it to the slave-nodes to tell them when to begin local-phase control. As shown in FIG. 3, in each slave node, the "SLAVE ENABLE" signal goes to the steady-state decision circuit 44, the filter 38 and the AND gates 32 and 39 when the master node has not achieved lock, the "SLAVE ENABLE" signal disables the steady-state circuit 44, filter 38 and AND gates 32 and 34.

In FIG. 3, the enable line also connects to the filter 38, so that the filter output can be disabled (i.e. set to voltage REF) during initialization. The steady-state decision circuit 44 may have an additional output that is directed away from the node (called the "lock indicator"). The lock indicator could be broadcast (in any suitable way, either by daisy-chain, bus, encoded data . . . ) to all other boards in the system to let the whole system know of the complete phase alignment.

When the PLL feedback in the master node N1 achieves lock, the steady-state circuit 62 activates the "SALVE ENABLE" signal to a "1", which enables the s—s decision circuit 44, filter 38 and AND gates 32 and 34 in each slave node.

The step-by-step initialization sequence is as follows:

1.
a) The master-node's PLL feedback path is disabled using the AND-gates 22, and 24.
b) The steady-state decision circuit 62 is disabled.
c) The constant voltage REF at the filter 16 is applied to the VCO 18 by disabling the filter 16 using the "MASTER ENABLE" line.
d) Each slave-node's PLL feedback path is disabled by the "SLAVE ENABLE" signal to the AND-gates 32 and 34.
e) The steady-state decision circuit 44 is disabled by the same "SLAVE ENABLE" signal.
f) The constant voltage REF at the filter 38 is applied to the delay lines by disabling the filter 38 using the "SLAVE ENABLE" signal.

2.
A duration longer than the minimum delay around the system is allowed so that the paths can be "loaded" with sufficient pulses that the master-node PLL does not "turn-off" when first activated due to the lack of pulses at "REFCLK" input to the PFD.

b) The master-node circuits (PLL and steady-state circuit) are enabled after this wait-time.

c) The system attains phase-frequency lock as per the master-node PLL. The master node's decision circuit 62 then broadcasts a signal to the rest of the slave-nodes indicating that local node control can begin.

3.

a) In each slave-node, upon activation of the "SLAVE ENABLE" signal by the master-node, the AND gates 32 and 34, enable its PLL action; the steady-state circuit 44 also is enabled.

4.

a) Each slave-node begins to adjust its local delays. As this happens, the master-node N1 will be required to change the frequency of its VCO18 which might cause a loss of PLL lock. This condition must not affect the slave-nodes once they have begun local delay adjustments. Therefore, either the master-node N1 maintains its lock indicator signal, or the slave-nodes must trigger only on the first indication of the master-node lock indicator.

5.

a) All the slave-nodes and the master-node converge on an operating point.

6.

a) Using some suitable means, as explained earlier, the slave-nodes broadcast their own "lock indicator" signals to each other and synchronous communication begins.

At this time, the propagation time between the respective detection points of any two adjacent nodes is the same as the propagation time between respective detection points of any other two adjacent nodes. Hence, in terms of their propagation delays, (POST1A+L1A+PRE2A)=(POST2A+L2A+PRE3A) . . . =(POST8A+L8A+PRE1A)—and likewise for propagation paths B and C.

It will be appreciated that distributed control of clocking system according to the present invention relies upon the concept that overall control can be obtained from all of the nodes working individually, but in concert. Each node is responsible for part of the control of the clock, using locally available information to alter its delay characteristics in such a way that, when the adjustments at all nodes are taken into account, they will balance the entire system.

It will be appreciated that the synchronous clocking system of the present invention is not limited to synchronizing the clock signals of printed circuit boards, but could be used for synchronizing the clock signals of VLSI microchips or other electronic, optical or optoelectronic systems, or even wireless systems.

Although the clock synchronization system in accordance with the present invention has been illustrated as a discrete system that may be applied to a distributed computer or switching system, it is highly desirable to integrate it into the distributed computer or switching system. For instance, an optical backplane implemented in a distributed computer which carries the data transfers between the nodes could also be used to carry the pulses for the clock synchronization system. In addition, high-end commercial processor chips such as DEC-alpha, Pentium, and PowerPC, already contain phase-locked loops and clock multipliers. Therefore, an integrated clock synchronization system could be built using these structures at each node (or chip) where the interconnects between pairs of nodes (or chips) are either electronic or photonic.

The interfaces between the optical paths and electronic lines could consist of standard optoelectronic devices such as the multiple quantum well PiN diode (MQW), the vertical cavity surface emitting Laser (VCSEL) and the metal-semiconductor-metal photo detector (MSM) that convert the electrical signals to optical signals and vice-versa.

Although the above-described embodiment uses three distinct transmission paths to propagate the trains of pulses S, CW and CCW to the nodes, it should be noted that there are other ways of conveying the requisite information between the nodes, possibly using only one transmission medium. For example, pulse trains CW and CCW could be propagated in opposite directions along a single copper wire using the technique described in the article by Kanichi Ishibashi et al. entitled "Simultaneous Bidirectional Receiver Logic", IEEE Micro, January–February 1999, pp. 14–18.

It should be noted that, in FIG. 2, the ends of the "fast" paths, i.e. the outputs of delay elements 26C and 28B, are not connected to anything. It is envisaged that these uncommitted outputs could be used advantageously for other purposes, such as more sophisticated methods for maintaining the correct number of pulses in the system.

It should be noted that, if the invention were used to synchronize, for example, a network of computers distributed about a building, it would be desirable for each computer to "know" that all of them were synchronized. It is envisaged, therefore, that, when the output of its steady state circuit 44 was stable, each slave node could transmit a "lock indicator" signal to the other nodes, conveniently by encoding the pulses themselves as previously mentioned. Alternatively, the "lock indicator" signal could be transmitted to the other nodes using data communications links.

While the above-described method of using slow pulse train S to maintain the frequency so that the pulses arrive at the distributed nodes simultaneously, is particularly advantageous when used for the above-described clock synchronization system, it is envisaged that it could be used for other applications which require a series of pulses to be supplied to a series of nodes.

Although an eight-node example has been illustrated, any number of nodes can be implemented simply by splicing in more slave-nodes and transmission lines and increasing the number of bits in the synchronous counter 20. It should be noted that the easiest implementations ensure that the counter 20 always uses a multiple of 2 (i.e. the counter can count to 2, 4, 8, 16, 32 . . . ), but other numbers of nodes can be accommodated by making the counter more complicated.

Embodiments of the present invention may be used in any system requiring highly synchronized clock control, such as data processing and switching applications, and are particularly useful with distributed systems. As clock speeds and data transmission rates increase, and the amount of traffic through networks increases, it is evident that photonic interconnects will become prevalent for moving data at very high rates from one node to another using the propagation of light. By using optical interconnects to implement the clock system of the present invention, at least three important advantages can be realized. Because the optical interconnect paths offer little or no impedance to propagation of signals, high speed circuits on one optoelectronic/VLSI chip can communicate with similar circuits on other optoelectronic/VLSI chips at rates comparable to the normal intra-chip speeds. This is exemplified in the publication by A. V. Krishnamoorty & D. A. Miller, "Scaling Optoelectronic-VLSI Circuits into the $21^{st}$ Century: A Technology Roadmap", IEEE J. of Selected Topics in Quantum Electronics, Vol. 2, No. 1, April 1996, pp 55–76. It is as though the signals have remained "on-chip", and thus can change as fast as the integrated microelectronics. The second feature is that high speed optical signals can be propagated over relatively large distances compared to electrical signals. The third advantage of an optical interconnect is the possibility of comparatively low power consumption because the circuits have very small dissipating loads. This has been reported in the publication "Optical Receivers for Optoelectronic VLSI", by T. K. Woodward, A. V. Krishnamoorty, A. L. Lentine & L. M. F. Chirovski, IEEE J. of Selected Topics in Quantum Electronics, Vol. 2, No. 1, April 1996, pp 106–116. Accordingly, embodiments of the present invention could employ high speed optical propagation of signals, or be implemented wholly electronically.

Many modifications to the above-described embodiments of the invention can be carried out without departing from the scope thereof, and therefore the scope of the present invention is intended to be limited only by the appended claims.

The invention claimed is:

1. A method of providing synchronized clock signals at "N" distributed nodes in a synchronous system, the nodes comprising a master node and a plurality of slave nodes interconnected by first and second propagation channels, comprises the steps of:
    at the master node,
        (i) generating a first pulse train and a second pulse train each being regular and having a period (T),
        (ii) propagating the first pulse train around the plurality of slave nodes via the first propagation channel;
        (iii) propagating the second train of pulses around the plurality of slave nodes via the second propagation channel such that the pulses of the second train of pulses arrive at respective ones of the plurality of slave nodes in reverse order to the pulses of the first pulse train; and
        (iv) maintaining the rate of each of the first and second pulse trains such that there are "pN" pulses in each propagation channel at any time, where "N" is the number of nodes, including the master node, and "p" is an integer, the pulses of the first train of pulses arrive at respective ones of the plurality of slave nodes substantially simultaneously, and the pulses of the second train of pulses arrive at respective ones of the plurality of slave nodes substantially simultaneously; and
    at each of the slave nodes,
        (v) detecting arrival at a predetermined detection point of a pair of pulses, the pair comprising one pulse from each of the first pulse train and the second pulse train; and
        (vi) generating a clock signal event in dependence upon the pair of pulses both arriving at the detection point with a phase difference below a preset level.

2. A method according to claim 1, further comprising, at each slave node, the step of adjusting delays in each propagation channel, when the pairs of pulses in the two channels do not arrive with the required phase difference, so as to reduce phase differences between subsequently-arriving pairs of pulses, the arrangement being such that, when each of the slave nodes is generating clock signal events, the propagation time between respective detection points of each pair of adjacent nodes is equal to the propagation time between respective detection points of each other pair of nodes.

3. A method according to claim 2, in a system having delay units in each propagation channel at each of the slave nodes, each delay unit comprising a pre-delay unit disposed upstream of the detection point and a post-delay unit disposed downstream of the detection point, wherein the step of adjusting the delays is effected such that any increment in a pre-delay is compensated by an equal decrement in the post-delay disposed in the same propagation channel, and vice versa.

4. A method according to claim 3, wherein, at each slave node, increments and decrements to a pre-delay in one of the propagation channels are accompanied by equal decrements and increments, respectively, to the post-delay in the other of the propagation channels.

5. A method according to claim 3, wherein the adjustments to the pre-delay unit and post-delay unit of a particular node are not the same as adjustments to the pre-delay and post-delay of others of the slave nodes.

6. A method according to claim 1, wherein the step of maintaining the pulse rate comprises the step of dividing the frequency of the first and second pulse trains by an integer multiple of the number of nodes, to produce a third pulse train at a lower frequency, propagating the third pulse train around the nodes via a third propagation channel substantially identical to the first and second propagation channel, and adjusting the rate of the first and second pulse trains to maintain a predetermined phase relationship between third pulse train pulses entering the third propagation channel and third pulse train pulses leaving the third propagation channel.

7. Apparatus for providing synchronized clock signals at "N" distributed nodes in a synchronous system, the apparatus comprising a master node unit and a plurality of slave node units interconnected in series by first and second propagation channels, the master node unit comprising:
    pulse generation means for providing a first pulse train and a second pulse train, the pulse trains each being regular and both having the same period;
    means for propagating the first pulse train around the slave nodes via the first propagation channel and the second pulse train around the slave nodes via the second propagation channel; and
    means for maintaining the rate of the first pulse train and second pulse train such that, at any instant, there are "pN" pulses in each propagation channel, where "N" is the number of nodes, including the master node, and "p" is an integer; and such that the pulses of the second pulse train arrive at respective ones of the plurality of slave nodes substantially simultaneously and the pulses of the first pulse train arrive at respective ones of the plurality of slave nodes substantially simultaneously, but in reverse order to the first pulse train;
    each of the slave node units comprising:
    detection means for detecting arrival at a predetermined detection point of a pair of pulses comprising one pulse from each of the first pulse train and the second pulse train, respectively, and generating a clock signal event in dependence upon the phase difference between the pair of pulses being less than a preset level.

8. Apparatus according to claim 7, wherein each slave node unit comprises adjustable delay units disposed in each propagation channel and means responsive to phase differences between the pairs of pulses being greater than the preset level for adjusting the delay units so as to reduce phase differences between subsequently-arriving pairs of pulses, the arrangement being such that, when the pairs of pulses have substantially no phase difference, each propagation channel segment between a pair of adjacent ones of the nodes provides the same propagation delay as every other propagation channel segment between a different pair of adjacent nodes.

9. Apparatus according to claim 8, wherein the adjustable delay units each comprise a pre-delay unit disposed upstream of the detection point and a post-delay unit disposed downstream of the detection point, and each slave node further comprises means for adjusting the duration of the pre-delay unit and post-delay unit such that any increment in the pre-delay unit is compensated by an equal decrement in the post-delay disposed in the same propagation channel, and vice versa.

10. Apparatus according to claim 8, wherein the adjusting means adjusts pre-delay units and post-delay units in both propagation channels, such that increments and decrements to a pre-delay in one of the propagation channels are accompanied by equal decrements and increments, respectively, to the post-delay in the other of the propagation channels.

11. Apparatus according to claim 8, wherein each of the pre-delay units and post-delay units comprises a plurality of delay elements and means for increasing the number of delay elements active in one of the delay units and decreasing the number of active delay elements in the other of the delay units correspondingly.

12. Apparatus according to claim 8, wherein each detection means comprises a phase/frequency device that provides an error signal proportional to the phase difference between the pair of pulses from the first and the second pulse trains.

13. Apparatus according to claim 12, further comprising means responsive to the error signal for controlling the adjustable delay units.

14. Apparatus according to claim 8, wherein the means for maintaining the pulse rate comprises means for dividing the frequency of the first and second pulse trains by an integer multiple of the number of nodes, to produce a third pulse train at a lower frequency, means for propagating the third pulse train around the nodes via a third propagation channel substantially identical to the first and second propagation channel, means for detecting phase relationships between third pulse train pulses entering the third propagation channel and third pulse train pulses leaving the third propagation channel, and means for adjusting the rate of the first and second pulse trains to maintain a predetermined said phase relationship.

15. Apparatus according to claim 8, wherein the propagation channels linking the detection means at the different nodes are provided by a single propagation path.

16. Apparatus according to claim 15, wherein the propagation path is electrical in nature.

17. Apparatus according to claim 15, wherein the propagation path is optical in nature.

18. A slave node unit for use in apparatus for providing synchronized clock signals at "N" distributed nodes in a synchronous system, the apparatus comprising a master node unit and a plurality of said slave node units interconnected in series by first and second propagation channels, the master node unit comprising:

pulse generation means for providing a first pulse train and a second pulse train, the pulse trains each being regular and both having the same period;

means for propagating the first pulse train around the slave nodes via the first propagation channel and the second pulse train around the slave nodes via the second propagation channel; and means for maintaining the rate of the first pulse train and second pulse train such that, at any instant, there are "pN" pulses in each propagation channel, where "N" is the number of nodes, including the master node, and "p" is an integer; and such that the pulses of the second pulse train arrive at respective ones of the plurality of slave nodes substantially simultaneously and the pulses of the first pulse train arrive at respective ones of the plurality of slave nodes substantially simultaneously, but in reverse order to the first pulse train;

the slave node unit comprising:

a plurality of delay units, comprising first pre-delay means and first post-delay means disposed prior to, and following, respectively, the detection point in a first propagation channel whereby pulses of the first train traverse the detection point, second pre-delay means and second post-delay means disposed prior to, and following, respectively, the detection point in a second propagation channel whereby pulses of the second train traverse the detection point, detection and control means for detecting phase differences between pulses from the first and second pulse trains and, responsive thereto, adjusting the delay units selectively so as to reduce the phase differences to below a preset level.

* * * * *